June 12, 1923.

M. N. JARVIS

TAP CHUCK

Filed May 14, 1921

1,458,300

INVENTOR.

M. N. Jarvis

BY

ATTORNEY.

Patented June 12, 1923.

1,458,300

UNITED STATES PATENT OFFICE.

MARSHALL N. JARVIS, OF GILDERSLEEVE, CONNECTICUT.

TAP CHUCK.

Application filed May 14, 1921. Serial No. 469,542.

*To all whom it may concern:*

Be it known that I, MARSHALL N. JARVIS, a citizen of the United States, residing at Gildersleeve, in the county of Middlesex and State of Connecticut, have invented certain new and useful Improvements in tap chucks, of which the following is a specification.

This invention relates to tap chucks, among the objects of the invention being the provision of an article of this character which is simple in construction, effective and certain in action, and which possesses the requisite strength to resist properly the various demands put upon it.

In the drawings accompanying and forming part of the present specification, I have shown in detail one of the several advantageous forms of embodiment of the invention which will be set forth fully in the following description. Obviously I am not limited to this disclosure. I may depart therefrom in a number of respects within the scope of the invention defined by the claims following said description.

Referring to said drawings.

Like characters refer to like parts throughout the several views.

Figure 1:
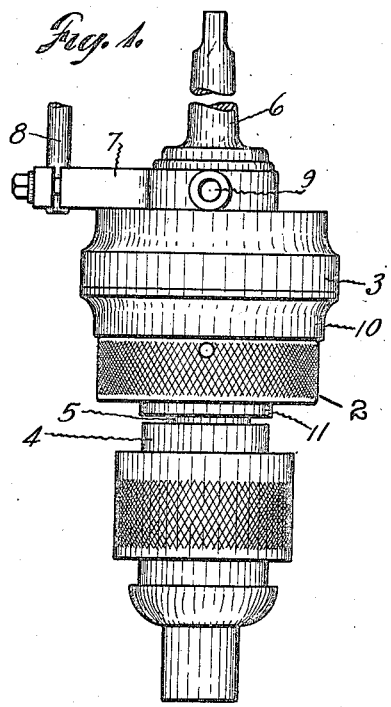
Figure 1 is an outside elevation of a tap chuck involving the invention and with the spindle held in the housing for causing this spindle to revolve in one direction.

It will be understood that a tap chuck comprises mechanism for rotating the tool-holding spindle thereof in opposite directions, a condition which is necessary when tapping a hole. In other words when the tap enters the hole to be tapped, it will be rotated in the direction necessary to cut the threads, the spindle being automatically rotated in the opposite direction when the hole is tapped to cause the tap to be fed out of the tapped holes. It will be understood that this automatic reversal is due to the movement longitudinally of the spindle.

In the drawings I have shown a tap chuck involving mechanism by which the advantage pointed out is insured but which also permits the insertion or removal of a tap without the necessity of stopping the spindle of the machine and by this result the same device can be advantageously employed in drilling and such uses where it is not necessary to reverse automatically or otherwise the direction of turning movement of the spindle.

In the accompanying drawings a chuck as 2 comprises a housing 3 which encases the necessary gearing for causing the projecting spindle 4 to rotate successively in opposite directions. The gearing mentioned is in itself not new with me but on the contrary is quite old and common in the art. Projecting from the rear of the spindle 4 and entering the housing is the shaft or extension 5, said housing 3 containing the necessary reversing mechanism. Extending from within the housing 3 is the taper shank 6 from which the gearing and spindle obtain their power. Rigidly attached to the housing 3 but loosely encircling the lower portion of shank 6, is the dog or arm 7, which supports by some clamping means, in either vertical or horizontal relation, the arm 7 furnished with the rod 8. The drawings show the rod in the vertical relation but by inserting it in the hole 9 the horizontal relation is obtained, the object of this rod, which is common practice, being to keep certain mechanism within the housing 3 from turning and being long enough to encounter some stationary part of the machine on which the chuck is being used.

The housing 3 comprises a main or body portion 10 and a sleeve 11 integral therewith and which is loosely encircled by the ring 12, held in vertical adjusted relation with the sleeve 11 as by the annular grooves 13 and 14 which alternately receive the balls 15 slidably held in radial holes 16 in the ring 12, and held alternately in contact with the walls of the grooves 13 or 14 by the springs 17, the inner ends of the springs bearing directly against the balls 15 and the opposite ends against the screws 18 threaded into the ring 12. At the outer end of the sleeve 11 are slidably inserted in holes the radial plugs or pins 19 which at certain times enter the annular groove 20 in the shank 5 of the spindle 4.

Figure 2:
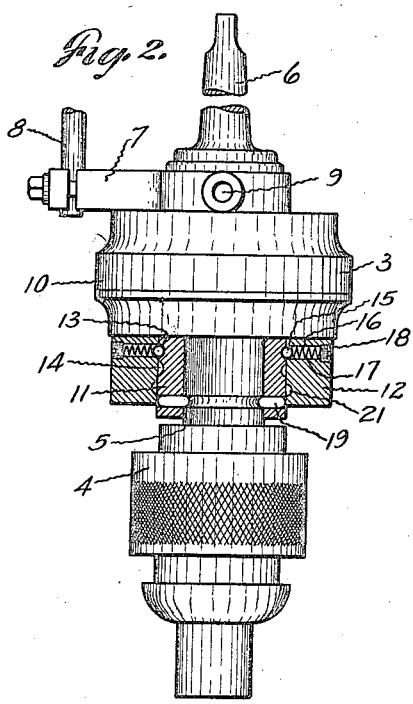
Fig. 2 is a view practically similar to Fig. 1 with a portion broken away and in section.
Figure 3:
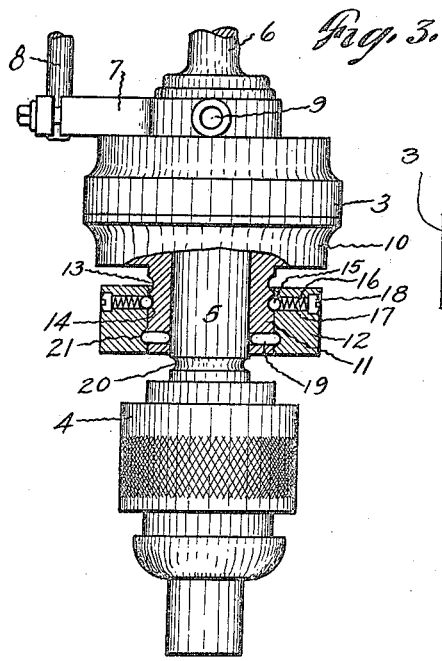
Fig. 3 is a view somewhat similar to Fig. 2, but with the spindle advanced and thus free to turn successively in opposite directions.

It can be readily seen (Figs. 2 and 3) that the ring 12 has two positions caused by the balls 15 being brought alternately into the grooves 13 and 14, this being accomplished by pushing the ring 12 up as in Fig. 2 thus causing the balls 15 to enter groove 13 and pulling the ring down as in Fig. 3 causes the balls 15 to enter the groove 14. In the inner surface and slightly below the center of the ring 12 is the annular groove 21 which, as will be noted, is brought out of and into engagement with the pins 19 by the raising and lowering of the ring 12 as in Fig. 2 and Fig. 3.

In Figs. 1 and 2 it will be noted that the spindle is pushed into the housing for causing the spindle to always run in one direction; said spindle being positively held in this relation by the pins 19 entering the groove 20 of the spindle. The pins 19 are held from coming out of engagement with the groove by the annular surface of the inside of the ring 12 which will not permit the outward movement of the pins 19. When the chuck parts are in this relation it is suitable for co-operating with either a drill or reamer or any tool where one direction of rotation is required.

In Fig. 3 it will be noted the chuck is adapted for a tap chuck, i. e., the spindle 4 may freely move into or out of the housing without interference to effect opposite rotation of the spindle.

Since the arm 7 and pin or rod 8, as I have before explained, holds the housing 3 from rotary movement, it will be seen that the ring 12 is also non-rotary. Therefore, it is obvious that the ring 12 may be moved in either of its positions without the necessity of stopping the machine.

There are also features on the spindle 4 which I have referred to before in this specification which permit the removal or insertion of a tool without stopping the machine, but as it is no part of this invention I have omitted any description of same.

Figure 4:
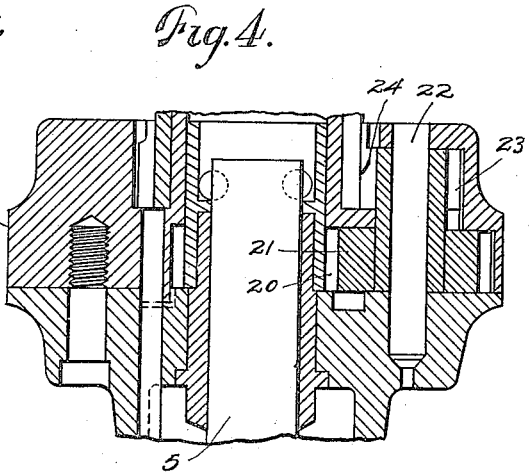
Fig. 4 is a section through the upper part of the body of the tap chuck.

In Fig. 4 of the drawings, I have shown the housing 3 which carries the spindle 5 upon which is a gear 20 in mesh with the gear 21 which is carried upon the stub shaft 22 which carries the gear 23 in mesh with the gear 24.

The gearing shown in Fig. 4 is essentially the same and operates in the same manner as that shown in the patent to Durrenberger Number 1,010,743, granted Dec. 5, 1921.

What I claim is:

A tap chuck comprising a housing to contain driving mechanism and furnished with a rigid projecting sleeve, a spindle operatively associated with the housing, extending through the sleeve and longitudinally adjustable therethrough, a ring surrounding the sleeve and advanceable and retracable thereon into two positions, yieldingly urged balls on the ring, the sleeve being separately grooved to receive the balls when the ring is in one of its two positions and thus hold the same in an adjusted position, radially slidable pins in the sleeve, the ring having a groove to receive the outer ends of the pins when the spindle is in its back position, and a groove on the spindle to receive the inner ends of the pins when the spindle is in said back position.

In testimony whereof I affix my signature.

MARSHALL N. JARVIS.

Witnesses:
 OLIVER H. CLARK,
 FRANK C. BARKER.